May 19, 1936. L. KIRSCHBRAUN 2,041,419
APPARATUS FOR MAKING ROOFING
Original Filed Aug. 1, 1929 2 Sheets-Sheet 1
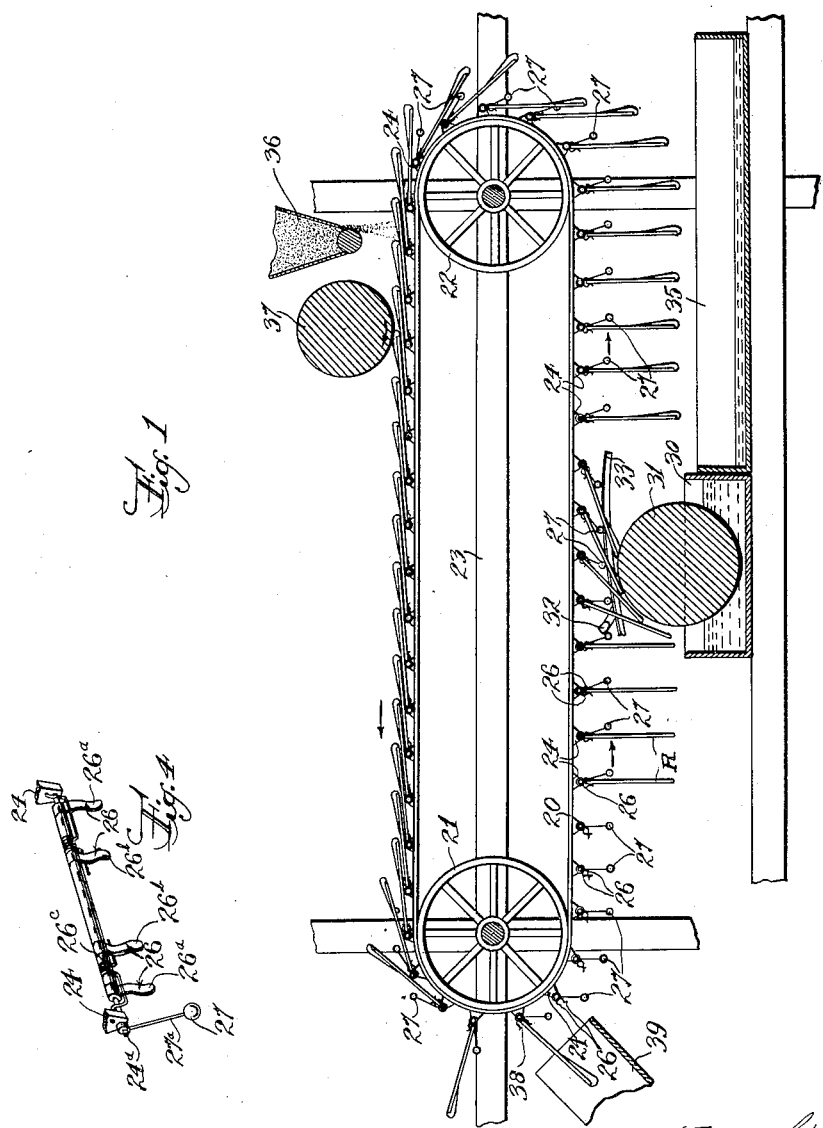
Inventor:
Lester Kirschbraun
BY
Samuel Sharman
Attorney.

May 19, 1936. L. KIRSCHBRAUN 2,041,419
APPARATUS FOR MAKING ROOFING
Original Filed Aug. 1, 1929 2 Sheets-Sheet 2
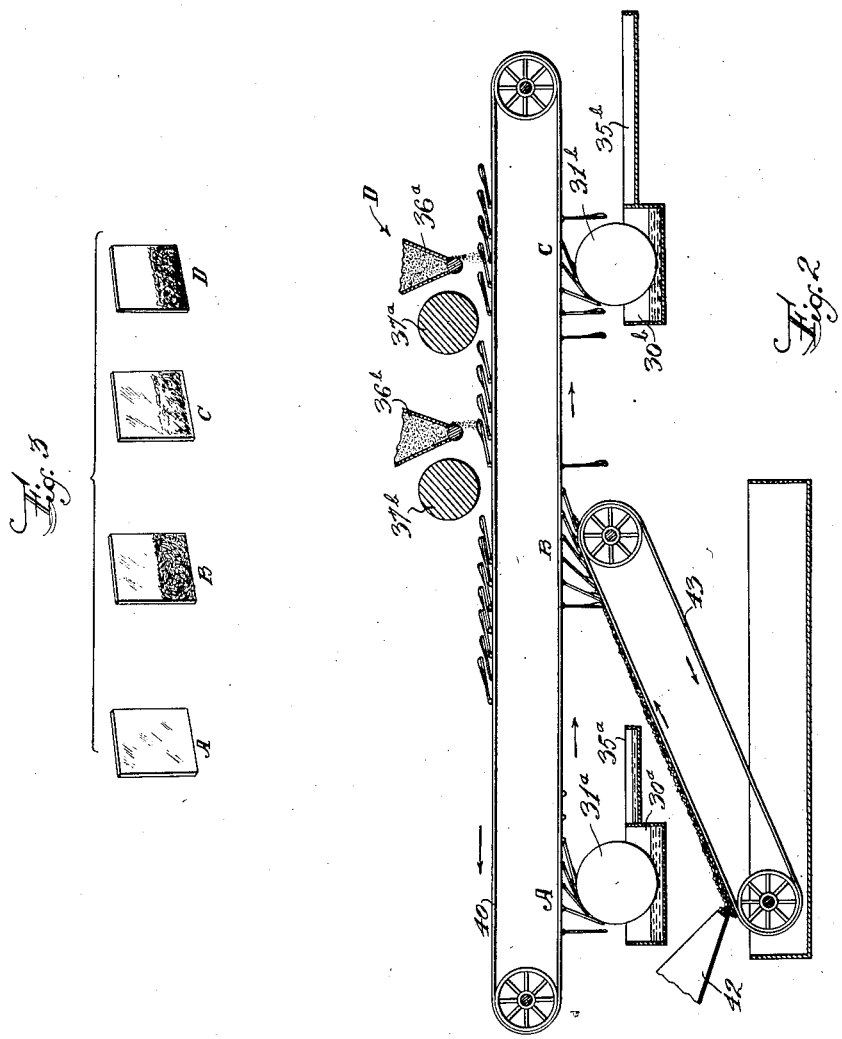

Patented May 19, 1936

2,041,419

UNITED STATES PATENT OFFICE 2,041,419

APPARATUS FOR MAKING ROOFING

Lester Kirschbraun, New York, N. Y., assignor, by mesne assignments, to The Patent and Licensing Corporation, Boston, Mass., a corporation of Massachusetts Original application August 1, 1929, Serial No. 382,632. Divided and this application November 16, 1932, Serial No. 642,833

5 Claims. (Cl. 91—18)

This application is a divisional of my copending application Serial No. 382,632, filed August 1, 1929.

This invention relates to the manufacture of composition roofing and is particularly concerned with the method of and apparatus for treating precut roofing elements to supply the lower or body portion thereof, which is intended to be exposed in use, with a layer of water and weatherproof coating material, within which may be imbedded granular or comminuted mineral surfacing material.

One of the objects of the invention is to provide a method and apparatus whereby the precut elements may be supplied with the coating material on the desired portions thereof while the elements are supported in position to permit the coating material to be rapidly applied thereto to enable the coating material to drain toward and over the lower or butt edge of the elements and accumulate over the portions which are to be exposed in use in a tapered layer increasing gradually in thickness towards the butt edge.

Another object of the invention is to provide means for thus coating the desired portions of the elements while the latter are suspended in substantially vertical position, and for thereafter arranging the elements in a substantially horizontal position and in partially overlapped relation one to another, in which position the granular or comminuted surfacing material is applied to the coated areas. This feature of the invention I have found to be very advantageous from a manufacturing standpoint in the production of roofing elements of the general type referred to in my previously issued Patent No. 1,612,776. The method and apparatus forming the subject matter of my present invention is designed particularly for rapidly and economically handling precut elements for the purpose of coating the exposed surface and edges thereof with waterproofing material and surfacing said coating with granular mineral material or the like.

Another object of my invention is to provide means for carrying on the surfacing operation with the elements held in the aforesaid horizontal and partially overlapped position by the mechanism from which they are suspended during the preceding coating operation whereby to retain positive control of the elements during the surfacing operation as well as during the coating operation.

In the embodiment of the invention, as will be more fully described hereinafter, the elements are supported from an endless conveyor which carries them for a portion of its travel in a substantially vertical but swingable position during which time the coating material is applied to the desired portions of the elements, the arrangement of the conveyor and the supporting mechanism thereon being such that for a portion of the travel of the conveyor, following the point at which the coating material is applied, the elements will be positioned substantially horizontally and in partially overlapped relation, in which position the mineral surfacing material is applied to the coated areas.

The principle of my invention as thus briefly described, may also be applied to the production of felt base shingles formed with a layer of bulking material to provide increased thickness and strength, such for example, as small bits or fragments of scrap prepared roofing affixed to the exposed face roofing elements and over which is applied a layer of waterproofed coating material surfaced in the usual manner.

In the accompanying drawings:

Figure 1 is a view in side elevation of mechanism for carrying out the invention, Figure 2 is a similar view illustrating conventionally mechanism for adapting the invention to the production of roofing elements formed with an additional bulking material, Figure 3 illustrates the elements at various stages of the procedure depicted at Figure 2, and Figure 4 is a detail, in perspective, of part of the mechanism.

The elements to be treated in accordance with my invention may comprise shingles or shingle strips of the flexible type, such as those made of a felted fibrous base saturated and coated with asphalt and surfaced with mineral grit, or they may comprise shingle elements of more or less rigid construction such as wooden shingles and the like, cut and shaped to desired form and dimensions.

Referring first to Figure 1, I provide an endless conveyor belt or chain 20, passing around pulleys 21, 22, supported on suitable framework 23, one or both of these pulleys being driven from any convenient source of power. This conveyor belt or chain is provided with means for supporting a series of the elements in spaced relation one to another and as shown, this supporting means preferably comprises brackets 24 fixed to the conveyor belt at the marginal edges thereof and forming loose bearings for horizontal shafts 24a. Spring pressed clamping fingers 26 are carried by the shafts and arranged in spaced pairs, the fingers 26a of each pair being disposed in opposition to the other fingers 26b of each pair. The fingers 26a are fixed to the shaft 24a, whereas the fingers 26b are mounted loosely thereon, and coiled springs 26c having one end thereof fixed to the brackets 24 bear upon the outer faces of the clamping fingers in each pair whereby to urge them normally to a position in which they are adapted to grip the elements inserted therebetween along the upper edge of the elements. At one end of one of each shaft 24a there is fixed a weighted lever 27 for a purpose as will presently appear.

The roofing elements to be treated and indicated in the drawings by the letter R, are inserted between the clamping fingers of the supporting mechanism at any convenient point after the latter pass beyond the pulley 21 so that the elements are suspended vertically downward of the belt and in swingable position, by virtue of the loose mounting of the shafts 24a, in a continuous series, so that in the progressive forward movement of the belt the elements will be brought into proper relation with the mechanism for applying the coating material thereto. The latter may be applied to the elements in any convenient way, and as shown on the drawings the coating device comprises a bath or tank of coating material 30 such as molten blown asphalt of about 220° F. melting point, this asphalt being usually maintained in the bath at about 400° F., in order to impart the desired fluidity thereto. A coating roll 31, mounted for rotation in the bath 30, picks up a layer of the coating material from the bath and transfers the same to the elements as the latter pass over the coating roll in the manner shown in Fig. 1. The arrangement of the supporting mechanism for the elements as aforedescribed, permits the elements to tilt forwardly in their passage over the coating roll in position to receive the coating material along the lower portion of the forward face thereof, this portion being that which is intended to be exposed in use. In order to preclude the possibility of the clamping fingers opening or releasing their grip upon the elements during the passage thereof over the coating rolls, a cam device 32 is mounted in position to guide the weight 27 onto a curved track 33 so that the weight will be confined in a path which will insure against opening of the clamping fingers as the elements pass over the coating rolls. The coating device 30 is positioned at a point intermediate the ends of the conveyor system in order to afford opportunity for the elements to hang vertically after they have received the coating material to permit the latter to drain downwardly and accumulate in a layer tapering in thickness towards the lower or butt edge of the elements and flow around the latter as well as the side edges and the edges of any tab-defining notches or slots therein, the excess coating material being received in a reservoir 35 extending from the coating device 30 to a point slightly beyond the pulley 22.

As the conveyor belt travels around the pulley 22, the clamping fingers, swinging with the shafts 24a assume a position in which the elements gripped thereby are transferred from the vertical or pendant position to a substantially horizontal position with the lower portion of one element overlapping the upper uncoated portion of the succeeding element in the series, this being the position in which the elements are carried forwardly in the upper stretch or return movement of the conveyor belt. In this position also the tendency of the weighted levers 27 to assume a depending position, will ensure, together with the action of the springs 26c, firm gripping of the elements by the clamping fingers. It will be understood of course, that the coating roll will be mounted below the conveyor and the supports for the clamping fingers spaced from each other at such suitable distances that the desired portions of the elements will be coated in passing over the roll and that when the thus coated elements are brought to the overlapped position along the upper stretch of the belt, the required transverse or coated area of the successive elements will be exposed with the remaining uncoated areas thereof covered by the preceding element in the series. At this point mineral surfacing material, such as crushed slate or the like, of any suitable color may be showered onto the uncoated uncovered areas of the elements as from a hopper 36, whereupon the elements pass beneath press rolls 37 for fixedly securing the surfacing material to the coating layer and causing it to become partially imbedded therein. After passing beyond the press rolls, the elements continue along their path until they reach the pulley 21 and as the conveyor belt passes around the latter the weighted levers 27 move through an arc of substantially 270° from the position which they have during the upper stretch of the movement of the belt to the position during the lower stretch of movement thereof, and during this movement will overcome the action of the springs 26c and thus cause the clamping fingers to be forced open as shown at 38, thereby releasing the elements, which latter may be received in any convenient collecting receptacle 39.

With certain modifications, the arrangement as thus described may be conveniently adapted for the manufacture of felted fibrous base roofing elements formed along the exposed areas with bulking material to give the elements additional strength and thickness and to provide the same also in some instances with a rough textured surface contour. For this purpose, I provide a conveyor system 40 similar in construction to that previously described, the elements being supported thereby and carried forwardly during the treatment as will now be described. The elements as thus supported are first subjected to a coating treatment as indicated by the stage A, the mechanism 30a, 31a for this treatment being similar to the coating device shown in Figure 1. The coating material supplied at this stage to the lower portion of one face of the element is adapted to form a binding medium for affixing to the base a bulking medium which is supplied thereto at stage B. This bulking medium may comprise scraps or fragments of roofing felt or prepared roofing, or any similar relatively large sized scraps or fragments. This bulking material may be supplied from a spout 42 onto an upwardly inclined conveyor belt 43 arranged so that the previously coated elements will contact with this bulking material at the upper end of the conveyor 43, and pick up the same by the adhesive nature of the coating material. The elements with the bulking fragments or scraps adhering thereto, and as indicated at B in Figure 3, then pass through another coating stage C wherein coating material is applied over the layer of bulking material in any convenient way, as for example, by a coating roll 31b similar to the coating rolls previously described. At C in Figure 3, as indicated the appearance of the element after it has passed through the coating stage C in Figure 2. After the elements have received the second coating layer at stage C, they are then caused to assume, substantially in the manner shown in Figure 1, a position in which the elements are arranged substantially horizontal and in partially overlapping relation, with the coated portions uncovered and in position to receive mineral surfacing material of any desired character as from hoppers 36a and 36b, at stage D, the mineral surfacing being pressed into and partially imbedded in the second coating layer by the press rolls 37a and 37b. After this surfacing treatment, and when the elements reach the opposite end of the conveyor, they are released from the clamping fingers precisely in the manner described in conjunction with Figure 1.

Having thus described my invention, it will be manifest that numerous variations and changes may be made therein without departing from the spirit of the invention as set forth in the appended claims.

I claim as my invention:

1. In mechanism for producing roofing material, means for supporting a series of precut roofing elements and conveying them through a definite path, means for applying waterproof adhesive material to the lower portion of a face of said elements in succession, means for bringing a bed of texture producing material into position to be contacted by the coated portions of said elements in succession whereby said fragments are transferred and become adherently united to said coated portions of the elements, means for applying waterproof adhesive coating material over the fragment covered areas of the elements, and means for partially imbedding granular mineral surfacing material in said last named coating.

2. In mechanism for producing roofing material means for supporting a series of precut roofing elements and conveying them through a definite path, means for applying waterproof adhesive material to the lower portion of a face of said elements in succession, means for bringing a bed of fibrous fragments in position to be contacted by the coated portions of said elements in succession whereby said fragments are transferred and become adherently united to said coated portions of the elements, means for applying waterproof adhesive coating material over the fragment covered areas of the elements and means for partially imbedding granular mineral surfacing material in said last named coating, said supporting and conveying means being arranged to cause said elements, before said mineral surfacing material is applied to assume a substantially horizontal position with the lower portion of each element covering the uncoated portion of the succeeding element in the series.

3. In mechanism for producing roofing materials, means for supporting a series of precut roofing elements and for progressively moving the series forwardly, said means including means for movably securing said elements to said supporting means in a vertical position for a portion of their travel, means for applying adhesive coating material to the lower portion of a face of said elements while thus supported, means cooperating with said securing means for positioning said elements in substantially horizontal position subsequent to the coating application, said securing means being spaced from each other along said supporting means a distance which is less than the length of said elements from top to butt to provide for partial overlapping of said elements with their coated portion exposed when in said horizontal position, and means for applying granular surfacing material to said coated portion of said elements while they are in said overlapped position.

4. In mechanism for producing roofing material, an endless horizontal conveyor having upper and lower stretches, spaced movable gripping members fixed to said conveyor for securing precut elements in vertical position, means for applying waterproof adhesive coating material to the lower portion of a face of said elements while thus supported, means cooperating with said gripping members for positioning the coated elements in substantially horizontal position upon the upper stretch of said conveyor, said gripping members being spaced from each other along said supporting means a distance which is less than the length of said elements from top to butt to provide for partial overlapping of said elements with their coated portions exposed when in said horizontal position, and means for applying granular surfacing material to the coated portions of the said elements while supported in the last named position.

5. In mechanism for producing roofing material, an endless horizontal conveyor, spaced clamping members swiveled to said conveyor for supporting precut roofing elements during a portion of the travel of said conveyor in vertical and freely swingable position, means for applying waterproof adhesive coating material to the lower portion of a face of said elements while thus supported, means cooperating with said clamping members for positioning said elements in substantially horizontal position subsequent to the coating application, said clamping members being spaced from each other along said supporting means a distance which is less than the length of said elements from top to butt for partial overlapping of said elements with their coated portion exposed, and means for applying granular mineral surfacing material to the coated portions of said elements while supported in the last named position.

LESTER KIRSCHBRAUN.